June 2, 1964
G. LEISENHEIMER
3,135,288
FLUID MIX APPARATUS FOR MEAT CURING PLANTS
Filed Oct. 23, 1961
3 Sheets-Sheet 1
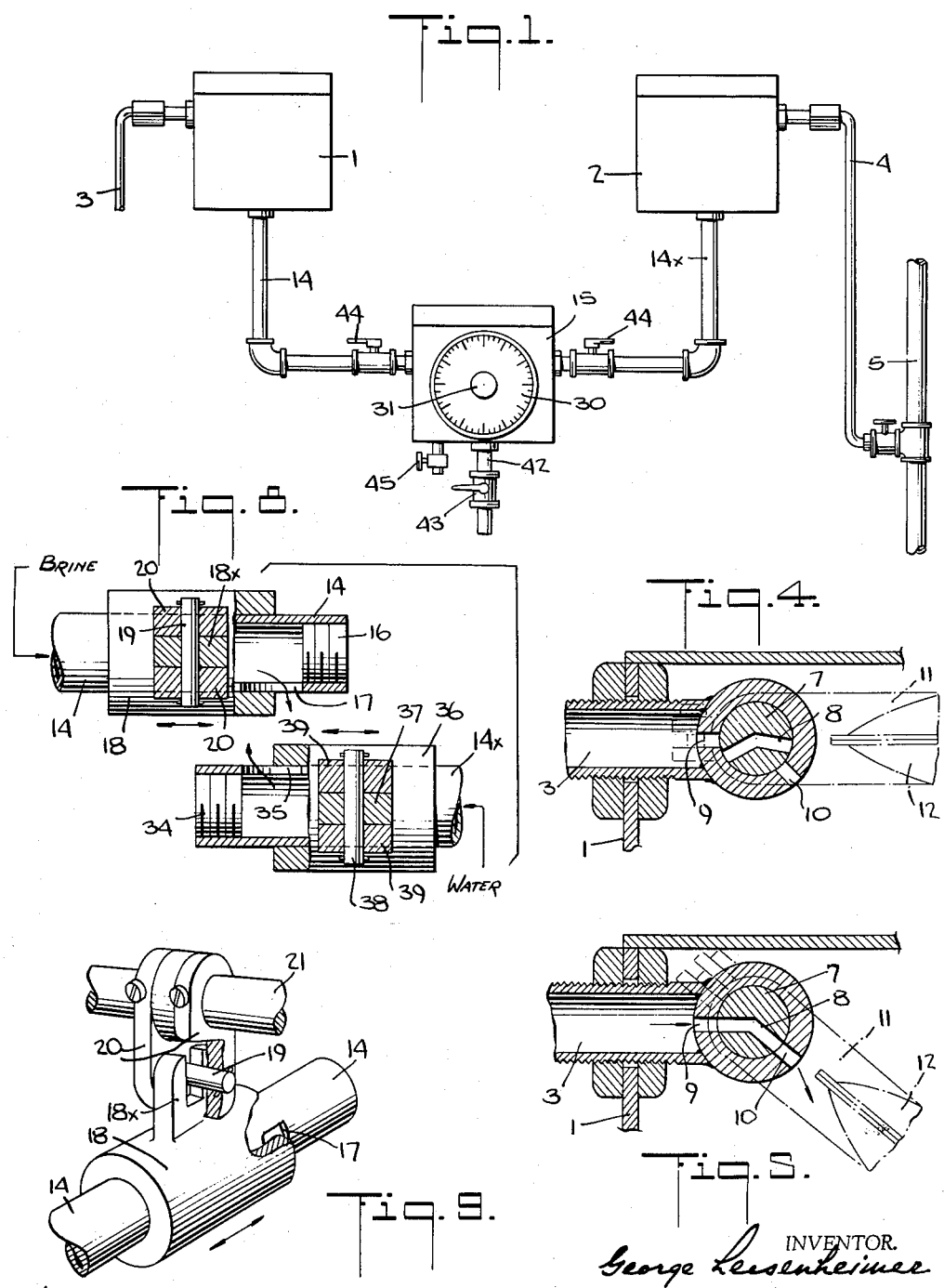
INVENTOR.
George Leisenheimer
BY W. Lee Helms
ATTORNEY

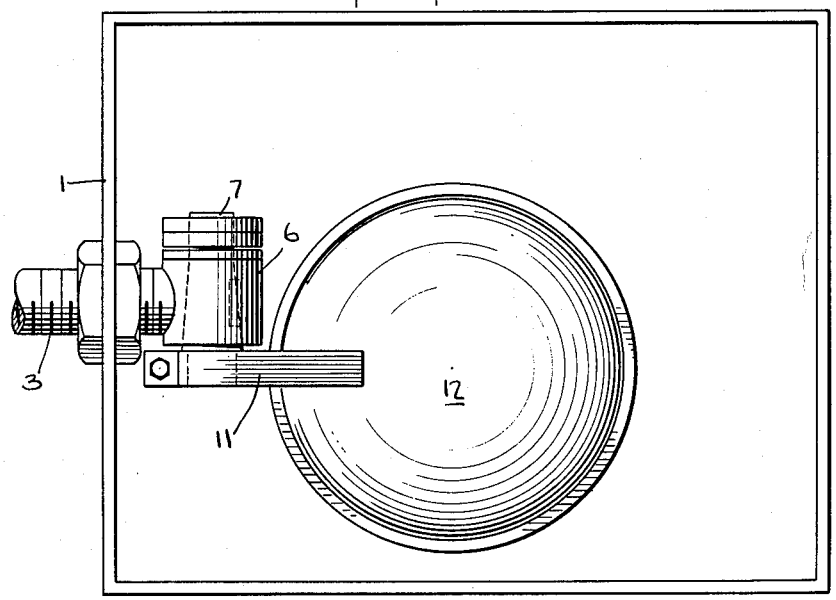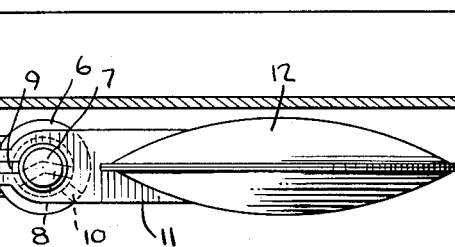

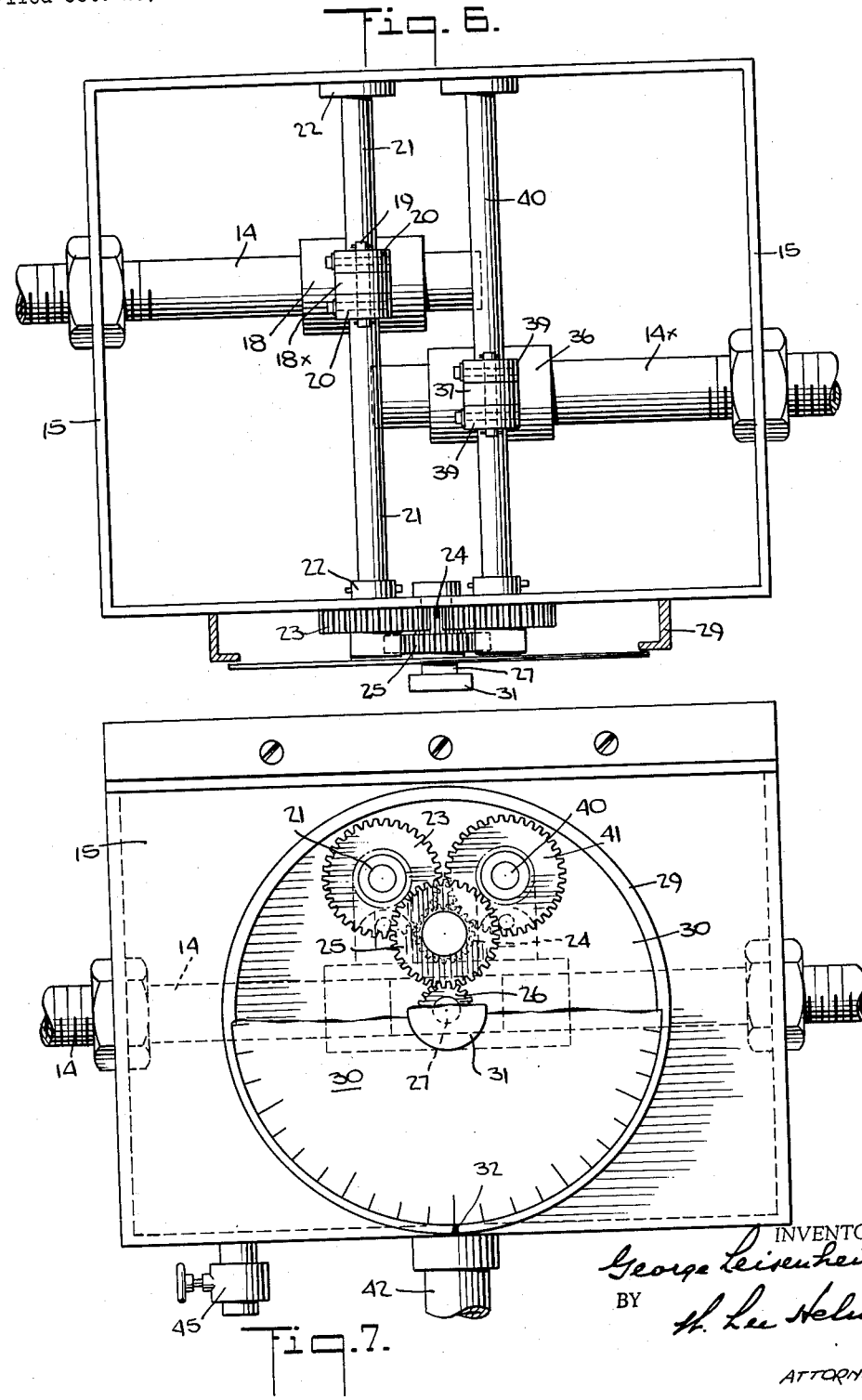

United States Patent Office 3,135,288
Patented June 2, 1964

3,135,288
FLUID MIX APPARATUS FOR MEAT
CURING PLANTS
George Leisenheimer, 78—36 85th St., Glendale, N.Y.
Filed Oct. 23, 1961, Ser. No. 146,741
1 Claim. (Cl. 137—553)

The object of the present invention is to provide a mixing apparatus for "brine" and water in meat curing plants, the term brine including solutions of any salts employed in meat curing. The apparatus enables tank storage of saturated solutions of meat curing salts and controlled aqueous dilution of the same, for desired different strengths of treating solution for specific curing conditions in the plant. A further object of the invention is to provide such an apparatus in form and material which will withstand the action of the curing salts in causing corrosion of working elements, and therefore the apparatus is especially designed to enable use of hard plastic and to have long life.

The invention will be described with reference to the accompanying drawings, in which:

FIG. 1 is a view in elevation showing the set-up of the apparatus when used.

FIG. 2 is a top plan view of a gravity discharging supply box for the saturated brine with means for automatically controlling ingress from the main storage tank. The cover of the box is removed. The same box, as to form and arrangement, is employed for the diluent water.

FIG. 3 is a view in elevation of the structure shown in FIG. 2 with the cover applied, part of the side wall being broken away.

FIG. 4 is a section through the float-control valve shown in FIGS. 2 and 3, the valve being closed.

FIG. 5 is a view similar to FIG. 4, showing the valve open.

In FIGURES 4 and 5 the float arm is shown in dotted lines.

FIG. 6 is a top plan view of the mixing box, with the cover removed.

FIG. 7 is a front side view of the mixing box, the dial being partly broken away, and certain elements being shown in dotted lines.

FIG. 8 is a composite view looking down on the brine and water valve elements, the latter being shown in partial horizontal section.

FIG. 9 is a perspective view showing the valve sleeve operating mechanism as applied to each of the brine and water valves, the valve sleeve being partly broken away.

Referring to the drawings, I have shown at 1 a gravity egress supply box which may be considered as for the saturated brine and a like box 2 for water. The brine box 1 may receive saturated brine from a storage tank and by inlet pipe 3; the box 2 for water may receive the latter by a pipe 4 from a main water pipe 5.

It is desired that the brine and water supply boxes have gravity discharge and therefore short-throw float-controlled valve operating means is contained in the upper area of each box. Referring to FIGS. 2 and 3 it will be seen that pipe 3, or pipe 4 as the case may be, leads to a valve housing 6 within the box and within the house is an oscillating valve plug 7 having a lateral port 8 adapted to communicate with an inlet 9 in register with pipe 3, and an outlet at 10 in valve housing 6. Carried by valve plug 7 is a float arm 11 on which is a float 12. In FIG. 3 the valve is closed, and it will be seen that a very short throw of arm 11, up or down as the case may be, will operate the valve so that if the fluid from the brine storage tank, or from the water main is under relatively high pressure, it will not materially affect the normal gravitational flow of the brine from the supply box to its outlet pipe 14. The outlet pipe for the water supply box is designated 14$^x$.

The mixing box is shown at 15. Discharge pipe 14 from the brine supply box leads into the mixing box 15 and is closed at its end as indicated at 16, FIG. 8. It is formed with a longitudinal slot 17 and the exposed area of this slot is controlled by a sleeve 18. As shown in FIG. 9, sleeve 18 carries an upstanding yoke 18$^x$, entered by a stud 19, the latter being carried by spaced depending arms 20 fixed to an oscillating shaft 21. Shaft 21 is journaled in bearing members 22 carried by the inner wall of the mixing box and one end thereof projects to the front of the box and has fixed thereto a driven gear 23. Gear 23 is driven by a spur gear 24, FIG. 7, carried rearwardly of a larger gear 25 which in turn is actuated by drive gear 26 on shaft 27. Exterior a shallow front housing 29, FIG. 6, is a dial disk 30 fixed to shaft 27 and outwardly thereof the shaft, or the disk itself, carries a thumb-wheel 31 for convenient rotation of shaft 27 simultaneously with dial disk 30. The housing 29 may carry a registration indicia, such as an arrow, and is indicated at 32, FIG. 7.

A discharge pipe, 14$^x$, from the water box 2 leads into the mixing box and is closed at its end as indicated at 34, FIG. 8. Within the box it is formed with a slot at 35 controlled by sleeve 36 having an upstanding yoke 37 which carries a pin 38 in the sense that the pin enters the yoke slot and is specifically carried by depending arms 39 like those of FIG. 9, the arms being fixed upon oscillating shaft 40.

Shaft 40 carries a driven gear 41 in mesh with said spur gear 24. The outlet pipe 42 for the mixing box 15 leads to the meat curing vessel or vessels and is controlled by hand valve 43, FIG. 1. When the apparatus is shut down, valves 43 and 44, FIG. 1, may be closed, and a drain valve at 45, FIG. 1, may be opened. Of course, the supply of fluid from boxes 1 and 2 will be discontinued by shutting off the pipes 3 and 4 from the brine storage tank and the water main, and if desired all three of the boxes, 1, 2 and 15, or the mixing box alone may be subjected to a reverse flow fluid cleansing action via drain valve 45.

The entire apparatus, as to all elements thereof, has been so formed as to be capable of construction with plastic as the material, polystyrene being one example. It will be understood that the dial 3 will be marked with graduated indicia relative to pointer 32, and that as the dial is turned with shaft 27 in a given direction, the shafts 21 and 40 will simultaneously be turned and the sleeves 18 and 36 will simultaneously be moved in opposite direction with relatively different effect on the flow of the two fluids from the supply boxes. Thus when the dial is turned in one direction the volume of brine passed into the mixing box will be lessened, and the supply of water increased, and when the dial is turned in the opposite direction a reverse action will be secured. By calibrating the indicia on the dial the exact relative proportions of saturated brine and water as desired by the operator will be instantly secured by moving the dial to bring the selected indicia into register with pointer 32.

It will be understood that various modifications may be made in the form and arrangement of the elements illustrated in the embodiment of the invention, without departing from the spirit of the claim annexed hereto.

Having described my invention, what I claim and desire to secure by Letters Patent is as follows:

A fluid mixing apparatus for meat curing tanks, comprising a box-like container formed of plastic material and having two mutually offset bushings in an upper area of the container, one at each end thereof, conduits projecting into the box, each in one of said bushings, two rockshafts extending at right angles to said conduits and crossing the same, an actuating arm on each rockshaft, a sleeve on each conduit, a slot being provided in each conduit positioned for opening and closing action by its appropriate sleeve, means intermediate each rockshaft and its appropriate sleeve for actuating the latter, a calibrated dial exterior the container, a shaft held by the container and supporting said dial, a gear operatively rotated by said dial and a train of gears connected to said rockshafts and to the gear controlled dial.

References Cited in the file of this patent

UNITED STATES PATENTS

| | | |
|---|---|---|
| 653,750 | Marcellus | July 17, 1900 |
| 1,912,295 | Mintz | May 30, 1933 |
| 2,145,133 | Riney et al. | Jan. 24, 1939 |
| 2,742,923 | Show | Apr. 24, 1956 |
| 2,949,130 | Knight et al. | Aug. 16, 1960 |
| 3,026,899 | Mischanski | Mar. 27, 1962 |